United States Patent
Castorina et al.

(10) Patent No.: US 12,530,301 B2
(45) Date of Patent: Jan. 20, 2026

(54) PREFETCH ATTRIBUTE VALUE PREDICTION

(71) Applicant: Arm Limited, Cambridge (GB)

(72) Inventors: Ugo Castorina, Biot (FR); Damien Matthieu Valentin Cathrine, Mougins (FR); Marco Coletta, Antibes (FR); Diogo Augusto Pereira Marques, Antibes (FR)

(73) Assignee: Arm Limited, Cambridge (GB)

( * ) Notice: Subject to any disclaimer, the term of this patent is extended or adjusted under 35 U.S.C. 154(b) by 22 days.

(21) Appl. No.: 18/419,752

(22) Filed: Jan. 23, 2024

(65) Prior Publication Data

US 2025/0238376 A1  Jul. 24, 2025

(51) Int. Cl.
*G06F 12/08* (2016.01)
*G06F 12/0862* (2016.01)
*G06F 12/0877* (2016.01)

(52) U.S. Cl.
CPC ...... *G06F 12/0862* (2013.01); *G06F 12/0877* (2013.01)

(58) Field of Classification Search
CPC ............ G06F 12/0862; G06F 12/0877; G06F 12/121; G06F 12/0811; G06F 2212/1016; G06F 2212/6024
USPC ........................................................ 711/137
See application file for complete search history.

(56) References Cited

U.S. PATENT DOCUMENTS

| | | | |
|---|---|---|---|
| 2013/0254485 A1* | 9/2013 | Kannan | G06F 12/0862 711/E12.024 |
| 2019/0138452 A1* | 5/2019 | Avrukin | G06F 13/1642 |

* cited by examiner

*Primary Examiner* — Hua J Song
(74) *Attorney, Agent, or Firm* — NIXON & VANDERHYE P.C.

(57) ABSTRACT

An apparatus includes prefetch control circuitry and prefetch request attribute prediction circuitry. The prefetch control circuitry controls issuing of a prefetch request to prefetch data from a memory system, the prefetch request specifying a prefetch target address and an attribute. The prefetch request attribute prediction circuitry predicts an attribute value to be specified for the attribute in the prefetch request, based on a relative frequency of memory access requests in a stream of memory access requests requiring a given attribute value for the attribute.

20 Claims, 10 Drawing Sheets

| Entry | Address pattern information | Counter |
|---|---|---|
| 0 | | 0 |
| 1 | | 1 |
| 2 | | 0 |
| 3 | | -1 |
| ⋮ | ⋮ | ⋮ |

FIG. 3

PREFETCH ATTRIBUTE VALUE PREDICTION

BACKGROUND

Technical Field

The present technique relates to the field of data processing. More particularly, the present technique relates to prefetching.

Technical Background

A prefetcher may perform prefetching, which includes generating a prefetch request to request that information associated with a given address is prefetched into memory. The prefetch request may be generated based on a prediction of addresses which may be required in the future by demand memory access requests generated by processing circuitry in response to execution of load/store instructions.

SUMMARY

At least some examples of the present technique provide an apparatus comprising:
prefetch control circuitry to control issuing of a prefetch request to prefetch data from a memory system, the prefetch request specifying a prefetch target address and an attribute; and
prefetch request attribute prediction circuitry to predict an attribute value to be specified for the attribute in the prefetch request, based on a relative frequency of memory access requests in a stream of memory access requests requiring a given attribute value for the attribute.

At least some examples of the present technique provide a system comprising:
the apparatus described above, implemented in at least one packaged chip;
at least one system component; and a board,
wherein the at least one packaged chip and the at least one system component are assembled on the board.

At least some examples of the present technique provide a chip-containing product comprising the system described above assembled on a further board with at least one other product component.

At least some examples of the present technique provide a non-transitory computer-readable medium to store computer-readable code for fabrication of an apparatus comprising:
prefetch control circuitry to control issuing of a prefetch request to prefetch data from a memory system, the prefetch request specifying a prefetch target address and an attribute; and
prefetch request attribute prediction circuitry to predict an attribute value to be specified for the attribute in the prefetch request, based on a relative frequency of memory access requests in a stream of memory access requests requiring a given attribute value for the attribute.

At least some examples of the present technique provide a method comprising:
controlling, by prefetch control circuitry, issuing of a prefetch request to prefetch data from a memory system, the prefetch request specifying a prefetch target address and an attribute; and
predicting, by prefetch request attribute prediction circuitry, an attribute value to be specified for the attribute in the prefetch request, based on a relative frequency of memory access requests in a stream of memory access requests requiring a given attribute value for the attribute.

Further aspects, features and advantages of the present technique will be apparent from the following description of examples, which is to be read in conjunction with the accompanying drawings.

BRIEF DESCRIPTION OF THE DRAWINGS

FIG. 3 illustrates the use of a frequency tracking indicator to track the relative frequency of memory access requests in a stream of memory access requests requiring a given attribute value;

DESCRIPTION OF EXAMPLES

Figure 1:
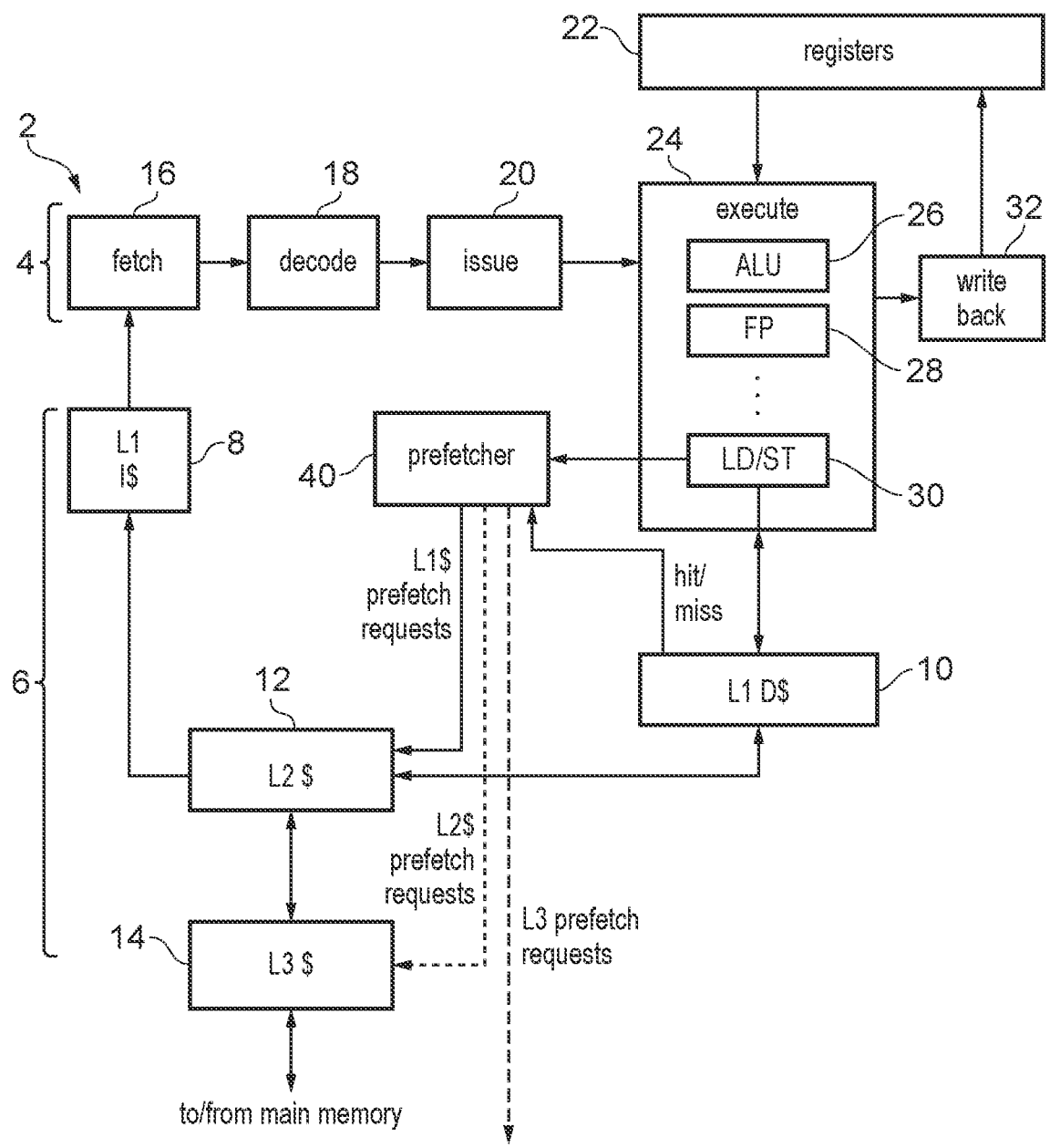
FIG. 1 illustrates an example of an apparatus having prefetcher circuitry.

An apparatus, such as a data processing apparatus, may have prefetch control circuitry to control issuing of a prefetch request to prefetch data from a memory system. The prefetch request may specify a prefetch target address which may be an address predicted to be useful for future demand memory access requests generated by processing circuitry in response to execution of load/store instructions. In this way, pipeline stalls caused by instructions waiting for data to be returned from memory can be reduced or avoided. The prefetch technique used to predict the prefetch target address is not particularly limited and may include, for example, stride prefetching, best-offset prefetching or indirect prefetching.

As described herein, memory access requests may be associated with an attribute which controls how the memory system should process the memory access request to access data from a target memory address. Thus, in the examples described herein, the prefetch control circuitry controls issuing of a prefetch request that specifies an attribute in addition to the prefetch target address, where the attribute may be used by the memory system receiving the prefetch request to control how the memory system should process the prefetch request to prefetch data from the prefetch target address. Hence, the prefetch control circuitry controls issuing of a prefetch request that specifies both a prefetch target address, which corresponds to an address in memory from which data is to be retrieved, and an attribute, which controls how the memory system should process the prefetch request to retrieve the data from the address.

However, in some cases, the value of the attribute specified in the prefetch request may not be suitable for a subsequent demand access request for the data prefetched by the prefetch request. For example, the value of the attribute specified in the prefetch request may not match a value of an attribute specified in a subsequent demand access request for the prefetched data. It will be appreciated that the attribute may comprise attributes of various types and the values of the attribute may take various forms. For example, the attribute may comprise one or more of:

- a cache coherency attribute specifying a cache coherency state in which data corresponding to the prefetch target address is to be brought into a cache (explained in greater detail with reference to FIG. 6);
- a tag checking attribute specifying whether a tag check would be required for the prefetch target address associated with the prefetch request (the tag check is explained in greater detail with reference to FIG. 7);
- an exclusive access attribute indicating whether the memory access request is subject to an exclusive access condition, the exclusive access condition dependent on exclusive access monitoring for checking whether any other requester has accessed the corresponding memory location in a period during which a current requester holds exclusive access rights (explained in greater detail with reference to FIG. 8); and
- a temporal access attribute indicating a likelihood of repeated future access to the prefetch target address within a forthcoming period (explained in greater detail with reference to FIG. 9).

As mentioned above, in some cases the attribute specified in the prefetch request is not suitable for indicating how the memory system should process the prefetch request to prefetch data from the prefetch target address because the attribute value specified in the prefetch request may not match an attribute value specified in a subsequent demand access request for the data prefetched by the prefetch request. For example, in the context of a cache coherency state attribute, the prefetch request may specify a certain cache coherency state attribute which specifies a certain cache coherency state in which data corresponding to the prefetch target address is to be brought into a cache, but the actual demand access request which uses the prefetched data may not actually request the data in that cache coherency state. For example, the data corresponding to the prefetch target address may be prefetched in a shared cache coherency state, but the subsequent demand access request may request the data in a unique cache coherency state. This may negatively impact other processing cores by unnecessarily causing the other processing cores to invalidate their cached copy of the data, resulting in an increased access time when that data is next accessed. Similarly, in the context of the tag checking attribute, the prefetch request may indicate that a tag check would be required for the prefetch target address associated with the target address, when actually no such tag check is required by a later demand access request for the prefetched data. In the context of the exclusive access condition, the prefetch request may indicate that that the memory access request is subject to an exclusive access condition, when actually the memory access specified by a later demand access request for the prefetched data is not subject to the exclusive access condition. Further, in the context of a temporal access condition, the prefetch request may indicate that a repeated future access to the prefetch target address within a forthcoming period is likely, when actually the likelihood of a future access to the prefetch target address within a forthcoming period is unlikely.

In such cases, the mis-prediction of the attribute value to be specified in the prefetch request results in wasted computing resources and time. For example, such a mis-prediction of the attribute value may cause additional processing to be incurred which would otherwise not be necessary had the value of the attribute in the prefetch request matched the value of the attribute specified in a later demand access request for the prefetched data. The mis-prediction may also cause other cache entries to be evicted from a cache unnecessarily, resulting in additional memory access requests to re-cache the evicted cache entries and performance loss if it is slower to access the evicted data in future. Further, in some configurations, the output of a given prefetcher may be used as a training input for training further prefetcher control circuitry, for example in a prefetcher hierarchy arrangement comprising prefetchers of different levels associated with different levels of caches. In such a configuration, errors in the predicted attributes specified in the prefetch request issued by a prefetcher of a given level are propagated down the prefetcher hierarchy, which may cause corruption to the training of prefetchers lower in the hierarchy resulting in the prefetchers lower in the hierarchy erroneously stopping the tracking of an input stream of memory access requests or erroneously tracking an input stream of memory access requests. This may cause considerable fluctuations in performance of the prefetchers.

In the examples discussed below, prefetch request attribute prediction circuitry is provided to predict an attribute value to be specified for the attribute in the prefetch request. This prediction is based on a relative frequency of memory access requests in a stream of memory access requests requiring a given attribute value for the attribute. That is to say, the input stream of memory access requests to the prefetch control circuitry (also known as a training stream), which may be used by the prefetch control circuitry to predict a target address for specifying in a prefetch request, may also be used to predict the value of the attribute to be specified in the prefetch request along with the prefetch target address.

Hence, the value of the attribute specified in the prefetch request is predicted based on how often memory access requests in an input stream of memory access requests require a given attribute value for the attribute. For example, the prediction may be based on a ratio of memory access requests that require a given attribute value for the memory access request to memory access requests that do not require the given attribute for the memory access request.

As a result, the granularity of the prediction technique is increased and thus the attribute prediction accuracy is increased. Accordingly, the likelihood that the prefetch request specifies an attribute value that is suitable for a subsequent demand memory access request for the prefetched data is increased. As such, the likelihood that unnecessary processing is incurred is reduced, resulting in a saving of time and computing resources. Prefetching efficiency is therefore increased.

In some examples, the prefetch request attribute prediction circuitry is configured to track the relative frequency of memory access requests in the stream requiring the given attribute value using a frequency tracking indicator having more than two tracking states.

Tracking the relative frequency using a frequency tracking indicator having more than two tracking states, for example a multi-bit indicator, results in an increased granularity of the frequency tracking and thus a more informed and accurate prediction of the attribute value to be specified for the attribute in the prefetch request. As described above, a more accurate prediction of the attribute value to be specified in the prefetch request results in a reduction in the likelihood that unnecessary processing is incurred and consequently a saving of time and computing resources.

A comparative example will now be described. In the comparative example, a single bit flag, such as a sticky bit, may be used to flag the presence/absence of a memory access request in a stream of memory access requests that requires a given attribute for the attribute. For example, the first instance of a memory access request in the stream requiring a given value for the attribute may cause the flag or sticky bit to be set, such as from a value of 0 to 1. Even if later memory access requests do not require that given attribute value, the flag or sticky bit remains set to a value of 1. As such, in this comparative example, a determination of the relative frequency of memory access requests that require the given attribute value and memory access requests in the stream that do not require the given value cannot be performed. Instead, the sticky bit or flag is set by the first instance of the memory access request requiring the given attribute value. This may result in the flag or sticky bit being set for a stream that includes, for example, a single memory access that requires the given attribute value even though the stream also includes a plurality of other memory access requests that do not require the given attribute value (in this case prediction that the given attribute value should be generated based on the sticky flag would risk incorrect predictions for the vast majority of prefetch requests generated according to that stream—this can harm performance by incurring unnecessary overheads based on the given attribute value). In other words, in this comparative example, no consideration is given to the ratio or relative frequency of the memory access requests in the stream that do or do not require the given attribute value.

As a result, the present technique which tracks the relative frequency of memory access requests in a stream of memory access requests requiring a given attribute value for the attribute, for example using a frequency tracking indicator having more than two tracking states, may make more informed predictions of the value for the attribute to be specified in the prefetch request than in approaches (such as the comparative example) that do not track the relative frequency or that use a single bit flag or indicator not having more than two tracking states.

As discussed above, a more informed prediction for the attribute value of the attribute in the prefetch request increases the likelihood that the correct or matching attribute value is predicted for how the memory system is likely to process a subsequent demand access request targeting previously prefetched data.

In some examples, the prefetch request attribute prediction circuitry is configured to maintain multiple frequency tracking indicators for tracking the relative frequency of memory access requests requiring the given attribute value for multiple streams of memory access requests. Thus, the prefetch request attribute prediction circuitry may be able to process multiple input streams of memory access requests resulting in increased throughput of prefetch requests.

In some examples, to predict the attribute value, the prefetch request attribute prediction circuitry is configured to compare a frequency tracking indicator indicative of the relative frequency of memory access requests in the stream requiring the given attribute value to a predetermined threshold, and in response to determining that the frequency tracking indicator satisfies the predetermined threshold, predict the attribute value as the given attribute value.

Hence, the threshold at which a determined relative frequency of memory access requests in the stream requiring the given attribute value results in that given attribute value being specified in the prefetch request may be configurable. This threshold could depend on the specific use-case or implementation. Accordingly, configurability and flexibility of the prediction is increased.

In some examples, the frequency tracking indicator comprises a counter and the prefetch request attribute prediction circuitry is configured to increment or decrement the counter by an increment value or decrement value based on whether a memory access request in the stream requires the given attribute value or another attribute value for the attribute. Thus, the relative frequency may be efficiently and accurately tracked in a more granular manner than with a sticky flag implementation. The counter value can be a measure of the ratio or relative proportion of the stream that requires the given attribute value.

It will be appreciated that whether the counter is incremented or decremented when a memory access request in the stream requires the given attribute value or another attribute value for the attribute is configurable. It will also be appreciated that the increment value may be a negative value and the decrement value may be a positive value or vice versa.

In one example, when it is determined that a memory access request in the stream requires a given attribute value for the attribute, the prefetch request attribute prediction circuitry is configured to increment the counter by an increment value. When it is determined that a memory access request in the stream requires another attribute value for the attribute (i.e. not the given attribute value), the prefetch request attribute prediction circuitry is configured to decrement the counter by a decrement value. In this way, the counter tracks the relative frequency of memory access requests in the stream requiring the given attribute value and memory access requests in the stream requiring another attribute value. When the value of the counter satisfies a predetermined threshold, the prefetch request attribute prediction circuitry may predict the attribute value as the given attribute value.

In an alternative example, when it is determined that a memory access request in the stream requires a given attribute value for the attribute, the prefetch request attribute prediction circuitry is configured to decrement the counter by a decrement value. When it is determined that a memory access request in the stream requires another attribute value for the attribute (i.e. not the given attribute value), the prefetch request attribute prediction circuitry is configured to increment the counter by an increment value. In this way, the counter tracks the relative frequency of memory access requests in the stream requiring the given attribute value and memory access requests in the stream requiring another attribute value. When the value of the counter does not exceed a predetermined threshold, the prefetch request attribute prediction circuitry may predict the attribute value as the given attribute value.

In some examples, the increment value and the decrement value are the same. In other examples, the increment and decrement value are different. Thus, a weighting may be applied to increase or decrease the relative weight associated with the presence or absence of memory access requests in the stream requiring a given attribute value for the attribute.

In some examples, at least one of the increment value and decrement value is variable based on a configuration input.

Thus, the increment and decrement values may be set depending on specific implementation or configuration needs. This increases the flexibility and configurability of the approach.

In some examples, the prefetch request attribute prediction circuitry is configured to modify the value of the counter when the value of the counter reaches a predetermined value or a predetermined prefetcher training period has elapsed. Over time, the counter may become saturated. In some examples it may be advantageous to modify the value of the counter, for example to reset the counter, when a predetermined condition is satisfied, for example when the counter value reaches a predetermined value or a predetermined prefetcher training period has elapsed. This helps provide an "aging" effect whereby counter increment/decrements made a long time ago gradually become less influential in future predictions, which can help the prefetcher to adapt to changing behaviour in program workloads over time.

In some examples, the attribute comprises an attribute which controls how the memory system should process the prefetch request to prefetch data from the prefetch target address. Various examples of attribute types that control how a memory system should process the prefetch request are described herein, and include attribute types as mentioned above. For example, the attribute may comprise various attribute types such as a cache coherency attribute, a tag checking attribute, an exclusive access attribute and/or a temporal access attribute. These will now be discussed.

In some examples, the attribute comprises a cache coherency attribute specifying a cache coherency state in which data corresponding to the prefetch target address is to be brought into a cache. The given attribute value may specify a unique cache coherency state representing that processing circuitry associated with the cache is allowed to write to a cache entry comprising the data corresponding to the prefetch target address without first issuing a request to check whether the data corresponding to the prefetch target address is held in a cache associated with other processing circuitry. In some examples, the memory access request requiring the given attribute value are memory store requests.

In some examples, the stream of memory access requests comprises one or more memory store requests. The prefetch request attribute prediction circuitry may thus track the relative frequency of memory store requests in the stream compared to memory access requests that are not memory store requests (such as memory load requests), for example using the frequency tracking indicator. Based on a determination that this tracked relative frequency satisfies a predetermined threshold, for example by comparing the frequency tracking indicator with the predetermined threshold, the prefetch request attribute prediction circuitry may predict the attribute value for the prefetch request as a value specifying a unique cache coherency state. Accordingly, responsive to the prefetch request, the data corresponding to the prefetch target address is brought into a cache in a unique cache coherency state. By supporting better predictions of whether a given prefetch stream should prefetch data in the unique cache coherency state (based on the monitored relative frequency of occurrence of stores in the stream), this can make it less likely that a prefetch unnecessarily prefetches data in the unique cache coherency state (risking loss of performance at other cores holding the same data because the request for data in the unique cache coherency state at one core may trigger invalidation of cached data for the same address at another core).

Alternatively, if the prefetch request attribute prediction circuitry determines that the tracked relative frequency does not satisfy a predetermined threshold, for example by comparing the frequency tracking indicator with the predetermined threshold, the prefetch request attribute prediction circuitry may predict the attribute value for the prefetch request as a value specifying a shared cache coherency state. A shared coherency state represents that processing circuitry associated with the cache is not allowed to write to a cache entry comprising the data corresponding to the prefetch target address without first issuing a request to check whether the data corresponding to the prefetch target address is held in a cache associated with other processing circuitry.

Thus, in some examples, memory store requests may require that the given attribute value specifies a unique cache coherency state, and memory load requests may require that the given attribute value specifies a shared cache coherency state.

In some examples, the attribute comprises a tag checking attribute specifying whether a tag check would be required for the prefetch target address associated with the prefetch request, the tag check comprising comparing an address tag associated with the prefetch target address with a guard tag stored in a memory system in association with a block of one or more memory locations comprising an addressed location identified by a target physical address corresponding to the prefetch target address. It will be appreciated that a tag check itself may not necessarily be performed at the time of prefetching. Instead the tag check may be deferred until a subsequent demand access request to the address is performed. Nevertheless, the attribute may specify whether a tag check would be required, which may be relevant for deciding whether to load the guard tag in response to the prefetch request, for example. The given attribute value may be a value that specifies that the tag check would be required for the prefetch target address. By enabling better predictions of whether the tag check is required, this can reduce the likelihood of memory bandwidth being wasted on loading of guard tags if this is ultimately not required by a subsequent demand access to the prefetched data.

In some examples, the attribute comprises an exclusive access attribute indicating whether the memory access request is subject to an exclusive access condition, the exclusive action condition dependent on exclusive access monitoring for checking whether any other requester has accessed the corresponding memory location in a period during which a current requester holds exclusive access rights. The given attribute value may be the value that indicates that the memory access request is subject to the exclusive action condition. Again, improved prediction of whether the exclusive access condition is required for a prefetch request can reduce likelihood of loss of performance due to unnecessary imposing exclusive access conditions which may impact other operations.

In some examples, the attribute comprises a temporal access attribute indicating a likelihood of repeated future access to the prefetch target address within a forthcoming period. The given attribute value may be a value that indicates a smallest likelihood of repeated future access to the prefetch target address within the forthcoming period. In some examples, the memory access requests requiring the given value are non-temporal load/store requests.

In some examples, the apparatus comprises cache control circuitry to select, based on the temporal access attribute, an initial value for a cache replacement policy value to be specified in a newly allocated cache entry for the prefetch target address; and victim selection circuitry to select a victim cache entry to be evicted from the cache dependent on the cache replacement policy value. By supporting improved prediction of whether the non-temporal/temporal access attribute is preferred for a prefetch request, this can support better performance by improving cache allocation policy to better meet the needs of a particular workload.

In some examples, the prefetch control circuitry is configured to send the issued prefetch request to further prefetch control circuitry to cause the further prefetch control circuitry to use the prefetch request as a training input for training the further prefetch control circuitry. In other words, the apparatus or prefetch control circuitry may be part of a hierarchy of a plurality of prefetchers.

In some examples, the prefetch control circuitry is configured to control issuing of prefetch requests based on stride prefetching, best-offset prefetching or indirect prefetching. Thus, the present technique may be used in combination with any of a variety of prefetching techniques and is not limited to a particular prefetching technique.

Specific examples will now be described with reference to the drawings.

FIG. 1 illustrates an example of a data processing apparatus 2. The apparatus 2 has a processing pipeline 4 for processing program instructions fetched from a memory system 6. The memory system 6 in this example includes a level 1 instruction cache 8, a level 1 data cache 10, a level 2 cache 12 shared between instructions and data, a level 3 cache 14, and main memory which is not illustrated in FIG. 1 but may be accessed in response to requests issued by the processing pipeline 4. It will be appreciated that other examples could have a different arrangement of caches with different numbers of cache levels or with a different hierarchy regarding instruction caching and data caching (e.g. different numbers of levels of cache could be provided for the instruction caches compared to data caches).

The processing pipeline 4 includes a fetch stage 16 for fetching program instructions from the instruction cache 8 or other parts of the memory system 6. The fetched instructions are decoded by a decode stage 18 to identify the types of instructions represented and generate control signals for controlling downstream stages of the pipeline 4 to process the instructions according to the identified instruction types. The decode stage passes the decoded instructions to an issue stage 20 which checks whether any operands required for the instructions are available in registers 22 and issues an instruction for execution when its operands are available (or when it is detected that the operands will be available by the time they reach the execute stage 24). The execute stage 24 includes a number of functional units 26, 28, 30 for performing the processing operations associated with respective types of instructions. For example, in FIG. 1 the execute stage 24 is shown as including an arithmetic/logic unit (ALU) 26 for performing arithmetic operations such as add or multiply and logical operations such as AND, OR, NOT, etc. Also the execute unit includes a floating point unit 28 for performing operations involving operands or results represented as a floating-point number. Also the functional units include a load/store unit 30 for executing load instructions to load data from the memory system 6 to the registers 22 or store instructions to store data from the registers 22 to the memory system 6. Load requests issued by the load/store unit 30 in response to executed load instructions may be referred to as demand load requests. Store requests issued by the load/store unit 30 in response to executed store instructions may be referred to as demand store requests. The demand load requests and demand store requests may be collectively referred to as demand memory access requests.

It will be appreciated that the functional units shown in FIG. 1 are just one example, and other examples could have additional types of functional units, or could have multiple functional units of the same type, or may not include all of the types shown in FIG. 1 (e.g. some processors may not have support for floating-point processing). The results of the executed instructions are written back to the registers 22 by a write back stage 32 of the processing pipeline 4.

It will be appreciated that the pipeline architecture shown in FIG. 1 is just one example and other examples could have additional pipeline stages or a different arrangement of pipeline stages. For example, in an out-of-order processor a register rename stage may be provided for mapping architectural registers specified by program instructions to physical registers identifying the registers 22 provided in hardware. Also, it will be appreciated that FIG. 1 does not show all of the components of the data processing apparatus and that other components could also be provided. For example, a branch predictor may be provided to predict outcomes of branch instructions so that the fetch stage 16 can fetch subsequent instructions beyond the branch earlier than if waiting for the actual branch outcome. Also a memory management unit could be provided for controlling address translation between virtual addresses specified by the program instructions and physical addresses used by the memory system.

As shown in FIG. 1, the apparatus 2 has a prefetcher 40 (also known as prefetcher circuitry 40) for analyzing patterns of demand target addresses specified by demand memory access requests issued by the load/store unit 30, and detecting address access patterns which can subsequently be used to predict addresses of future memory accesses. For example, the address access patterns may involve stride sequences of addresses where there are a number of addresses separated at regular intervals of a constant stride value. It is also possible to detect other kinds of address access patterns (e.g. a pattern where subsequent accesses target addresses at certain offsets from a start address). The prefetcher 40 maintains prefetch state information representing the observed address access patterns, and uses the prefetch state information to generate prefetch load requests which are issued to the memory system 6 to request that data is brought into a given level of cache. For example, when a trigger event for a given access pattern is detected (e.g. the trigger event could be program flow reaching a certain program counter address, or a load access to a particular trigger address being detected), the prefetcher 40 may begin issuing prefetch load requests for addresses determined according to that pattern. The prefetch load requests are not directly triggered by a particular instruction executed by the pipeline 4, but are issued speculatively with the aim of ensuring that when a subsequent load/store instruction reaches the execute stage 24, the data it requires may already be present within one of the caches, to speed up the processing of that load/store instruction and therefore reduce the likelihood that the pipeline has to be stalled.

The prefetcher 40 may be able to perform prefetching into a single cache or into multiple caches. For example, FIG. 1 shows an example of the prefetcher 40 issuing level 1 cache prefetch requests which are sent to the level 2 cache 12 or downstream memory and request that data from prefetch target addresses is brought into the level 1 data cache 10. Also the prefetcher 40 in this example could also issue level 2 prefetch requests to the level 3 cache 14 or main memory requesting that data from prefetch target addresses is loaded into the level 2 cache 14, and/or level 3 prefetch requests to the main memory requesting that data from prefetch target addresses is loaded into the level 3 cache 14. The level 2 or level 3 prefetch requests may look a longer distance into the future than the level 1 prefetch requests to account for the greater latency expected in obtaining data from main memory into the level 2 or 3 cache 12, 14 compared to obtaining data from a level 2 cache into the level 1 cache 10. In systems using prefetching into multiple levels of cache, prefetches at level 2 or 3 can increase the likelihood that data requested by a level 1 prefetch request or demand access request is already in the level 2 or 3 cache. However, it will be appreciated that the particular caches loaded based on the prefetch requests may vary depending on the particular circuit implementation.

As shown in FIG. 1, as well as the demand target addresses issued by the load/store unit 30, the training of the prefetcher 40 may also be based on an indication of whether the corresponding demand memory access requests hit or miss in the level 1 data cache 10. The hits/miss indication can be used for filtering the demand target addresses from training. This recognises that it is not useful to expend prefetch resource on addresses for which the demand target addresses would anyway hit in the cache. Performance improvement can be greater in focusing prefetcher training on those addresses which, in the absence of prefetching, would have encountered cache misses for the demand access requests.

While FIG. 1 shows a single instance of a prefetcher 40, it will be appreciated that some implementations may comprise more than one prefetcher, e.g. prefetchers trained to detect different kinds of memory access patterns and/or prefetchers trained on memory access requests processed by different levels of caches. It will be further appreciated that some implementations may comprise a hierarchy of multiple prefetchers, where the input of a prefetcher lower in the hierarchy is the output or prediction of a prefetcher higher in the hierarchy.

Figure 2:
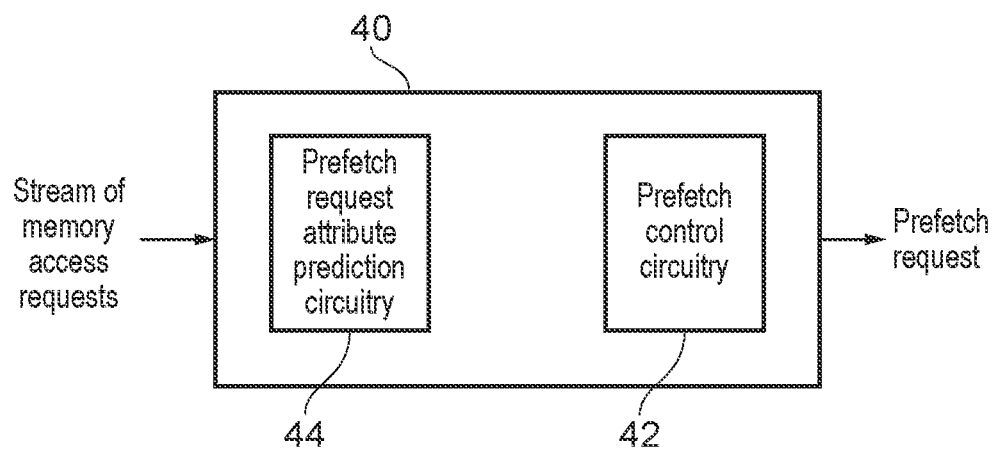
FIG. 2 illustrates an example of the prefetcher circuitry including the prefetch request attribute prediction circuitry and the prefetch control circuitry.

FIG. 2 illustrates an example of prefetcher circuitry 40, for example prefetcher 40 of FIG. 1, according to the present technique. Prefetcher 40 includes prefetch control circuitry 42 and prefetch request attribute prediction circuitry 44, and prefetcher 40 receives an input stream of memory access requests or information indicative of an input stream of memory access requests. The input stream of memory access requests received by prefetcher 40 may be demand target addresses specified by demand memory access requests issued by the load/store unit 30 as described with reference to FIG. 1, or alternatively may be prefetch requests issued by other prefetcher circuitry. Thus, as described with reference to FIG. 1, prefetcher 40 may be a prefetcher in a hierarchy of prefetchers where the input stream of memory access requests corresponds to issued prefetch requests from a prefetcher higher in the hierarchy of prefetchers.

Prefetch control circuitry 42 controls the issuing of a prefetch request to prefetch data from a memory system. The prefetch request specifies a prefetch target address and an attribute. The prefetch target address may be predicted using any of a number of different prefetching techniques, for example stride prefetching, best-offset prefetching or indirect prefetching. It will be appreciated that the type of prefetching will vary based on implementation and that the present technique may be applied irrespective of the type of prefetching performed.

Prefetch request attribute prediction circuitry 44 predicts an attribute value to be specified for the attribute in the prefetch request. This prediction is based on a relative frequency of memory access requests in a stream of memory access requests requiring a given attribute value for the attribute. Prefetch request attribute prediction circuitry 44 may track this relative frequency using a frequency tracking indicator having more than two tracking states, for example a multi-bit indicator or a counter.

FIG. 3 illustrates the use of a frequency tracking indicator to track the relative frequency of memory access requests in a stream of memory access requests requiring a given attribute value for four streams of memory access requests. In this example, the frequency tracking indicator comprises a counter, but it will be appreciated that the present technique is not limited thereto.

Prefetcher circuitry 40 may maintain table 46 to track streams of memory access requests received by the prefetcher 40. In some examples table 46 may correspond to a table that maintains prefetch state information as described with reference to FIG. 1, while in some examples table 46 may be a separate table. Table 46 may track address pattern information, for example for use in determining whether a given input memory access belongs to the stream, and making the prediction of a prefetch target address for specifying in a prefetch request, although this is not essential and the form of the table may vary depend on implementation. For example, for a stride prefetcher each entry may specify a corresponding stride value observed between successive memory accesses of the stream. For a best offset prefetcher each entry may specify a corresponding offset between two memory accesses in the stream that are not necessarily immediately adjacent in time. For an indirect prefetcher a given entry may specify information identifying pointer chasing patterns where a data value loaded by one memory access is used to compute the address of another memory access.

As described above, prefetch request attribute prediction circuitry 44 tracks the relative frequency of memory access requests in a stream of memory access requests requiring a given attribute value for the attribute using a frequency tracking indicator, which in this example comprises a counter. Table 46 includes Entries labelled from 0 to 3, each corresponding to a stream of memory access requests. The counter value for each of these streams of received memory access requests is shown in the column labelled 'Counter'.

Figure 4:
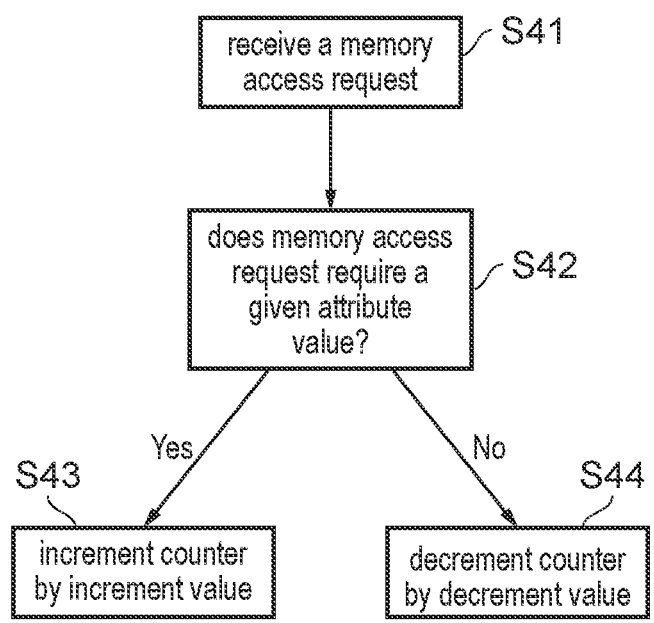
FIG. 4 illustrates steps for tracking the relative frequency of memory access requests requiring the given attribute value.

FIG. 4 illustrates steps for tracking the relative frequency of memory access requests in a stream of memory access requests requiring the given attribute value, for example for tracking the relative frequency of memory access requests requiring the given attribute value in one of the streams of memory access requests in table 56 (i.e. one of the Entries), and will be described in combination with an illustrative example.

In this illustrative example, the counter initially has a value of 0. A memory access request in a stream of memory access requests is received by the prefetcher 40 (step S41). Prefetch request attribute prediction circuitry 44 then determines whether the memory access request requires a given attribute value (step S42).

This determination may be made in a number of ways and may vary depending on the type of attribute being specified in the prefetch request. In some examples associated with the cache coherency attribute described herein, the prefetch request attribute prediction circuitry 44 determines whether the memory access request is a demand store request, and in response to determining that the memory access request is a demand store request, determines that the memory access request requires a given attribute value that specifies a unique cache coherency state. In some examples associated with a tag checking attribute described herein, the prefetch request attribute prediction circuitry 44 determines whether the memory access request specifies that a tag check would be required for the corresponding target address, and in response to determining that the memory access request specifies that a tag check would be required for the corresponding target address, determines that the memory access request requires a given attribute value that specifies that a tag check would be required. In some examples associated with an exclusive access attribute, the prefetch request attribute prediction circuitry 44 determines whether the memory access request specifies that the memory access request is subject to an exclusive access condition, and in response to determining that the access request is subject to an exclusive access condition, determines that the memory access request requires a given attribute value that specifies that the memory access request is subject to an exclusive access condition. In some examples associated with the temporal access attribute, the prefetch request attribute prediction circuitry 44 determines whether the memory access request is a non-temporal load/store request, and in response to determining that the memory access request is a non-temporal load/store request, determines that the memory access request requires a given attribute value that specifies a value that indicates a smallest likelihood of repeated future access to the prefetch target address within the forthcoming period.

If it is determined that the memory access request requires a given attribute value (Yes S42), the prefetch request attribute prediction circuitry 44 increments the value of the counter by an increment value (step S43). If it is determined that the memory access request does not require a given attribute value (No S42), the prefetch request attribute prediction circuitry 44 decrements the value of the counter by decrement value (step S44).

Consider an illustrative example in which a stream is received for which the first three requests in the stream after initialization of the counter are A, !A, !A, where A refers to a request requiring the given attribute value and !A refers to a request not requiring the given attribute value.

In this illustrative example, the first memory access request in the stream A is determined to require the given attribute value by the prefetch request attribute prediction circuitry 44. Thus, the counter value is incremented by an increment value, in this example an increment value of 1, by the prefetch request attribute prediction circuitry 44, so that the counter becomes 1.

Following this illustrative example, a further memory access request !A in the stream is received and it is determined that the memory access request does not require the given attribute value. Hence, the prefetch request attribute prediction circuitry 44 decrements the counter value by a decrement value, in this example a decrement value of 1, such that the counter value becomes 0. Then a still further memory access request !A is received and it is determined that the memory access request does not require the given attribute value. Hence, the prefetch request attribute prediction circuitry 44 decrements the counter value by a decrement value, in this example a decrement value of 1, such that the counter value becomes −1.

It will be appreciated that the number of memory access requests in a stream may vary and that the process described with respect to FIG. 4 may continue for a period of time, for example a predetermined training period or until a predetermined number of memory access requests have been received. Aging of counter values can also be applied, e.g. to periodically reset or reduce the counter values of each entry, so that influence of counter updates gradually reduces over time as the events that caused the counter updates are less likely to be relevant to future address access patterns.

Figure 5:
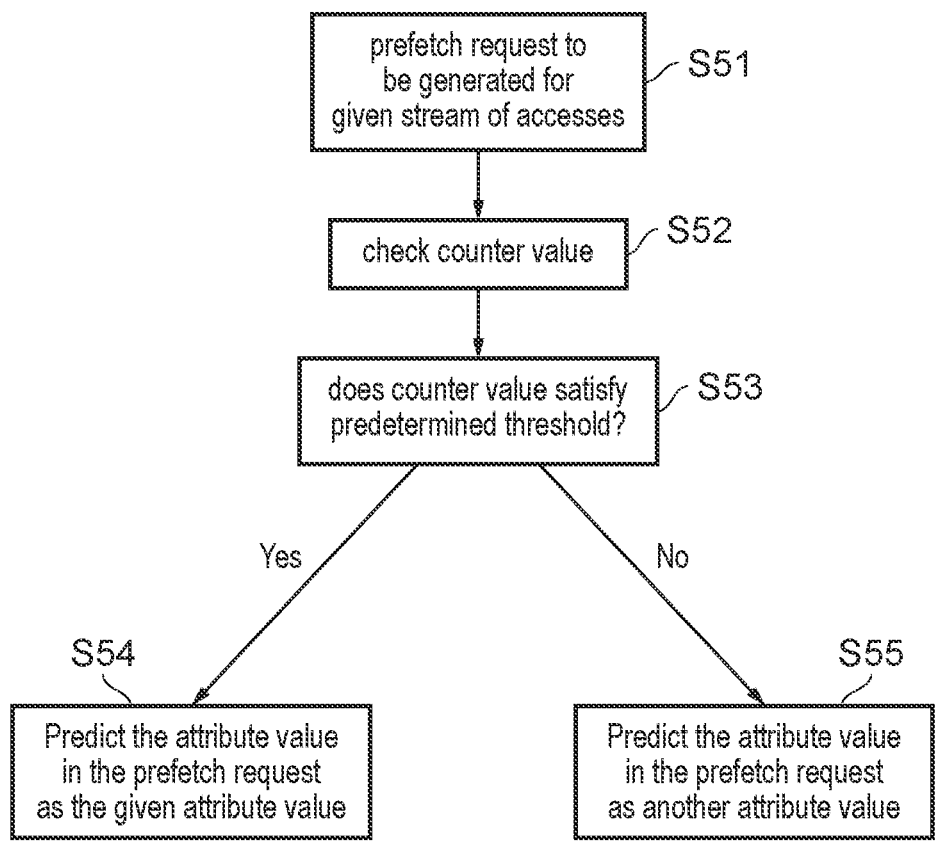
FIG. 5 illustrates steps for prefetch request attribute prediction.

FIG. 5 illustrates prefetch request attribute prediction which may be performed when a prefetch request is to be generated for a given stream of memory access requests.

At step S51, it is determined that a prefetch request is to be generated for a given stream of memory access requests. This determination may be based on determining that a prefetch request generation condition has been satisfied. The prefetch request generation condition may correspond to a predetermined training time period having elapsed or a predetermined number of memory access requests having been received.

At step S53, the value of the counter associated with the given stream of memory access requests is checked. For example, responsive to determining that a prefetch request is to be generated for a given stream of memory access requests, the counter value after the process corresponding to FIG. 4 for the memory access requests in the given stream of memory access requests has been completed is checked.

At step S53, it is determined whether the counter value satisfies a predetermined threshold. In response to determining that the counter value satisfies the predetermined threshold (Yes S53), the attribute value in the prefetch request is predicted as the given attribute value (step S54). In response to determining that the counter value does not satisfy the predetermined threshold (No S53), the attribute value in the prefetch request is predicted as another attribute value (step S55).

Referring back to the illustrative example, once it is determined that a prefetch request is to be generated for a given stream of memory access requests corresponding to the three memory access requests of the stream described above, the counter value is checked and determined to have a value of −1. In this example, the predetermined threshold for whether the counter value indicates that a given attribute is required is set at 0, though it will be appreciated that this value may vary depending on implementation. Thus, it is determined that the counter value of −1 does not exceed the predetermined threshold of 0, and hence the attribute value in the prefetch request value is not predicted as the given attribute value but rather is predicted as another attribute value.

The prefetch request may then be issued specifying a prefetch target address (determined using prefetching techniques) and an attribute having the another attribute value.

Reference will now be made again to the comparative example in which a sticky bit or single bit flag is used to determine the attribute to be specified in the prefetch request rather than the frequency tracking indicator of the present technique. In this comparative example, at the first instance of a memory access request requiring a given attribute value, i.e. the first memory access request A in the stream of memory access requests described above in the illustrative example, the sticky bit or flag would be set. The subsequent memory access requests not requiring the given attribute value, i.e. the subsequent memory access requests of the stream described above in the illustrative example, would not change the value of the sticky bit or flag. Thus, in this comparative example, a prefetch request would be issued with an attribute having the given attribute value despite the stream of memory access requests comprising only a single memory access requiring the given value compared to two memory access requests requiring another value. In contrast, using the present techniques as described above, the attribute would have an attribute value different from the given attribute value.

This exemplifies how the technique of tracking relative frequency may provide greater granularity of the prediction of whether the prefetch request should specify a given attribute value is increased. Accordingly, a likelihood that the prefetch request specifies an attribute value that is suitable for a subsequent demand access request may be increased.

Figure 6:
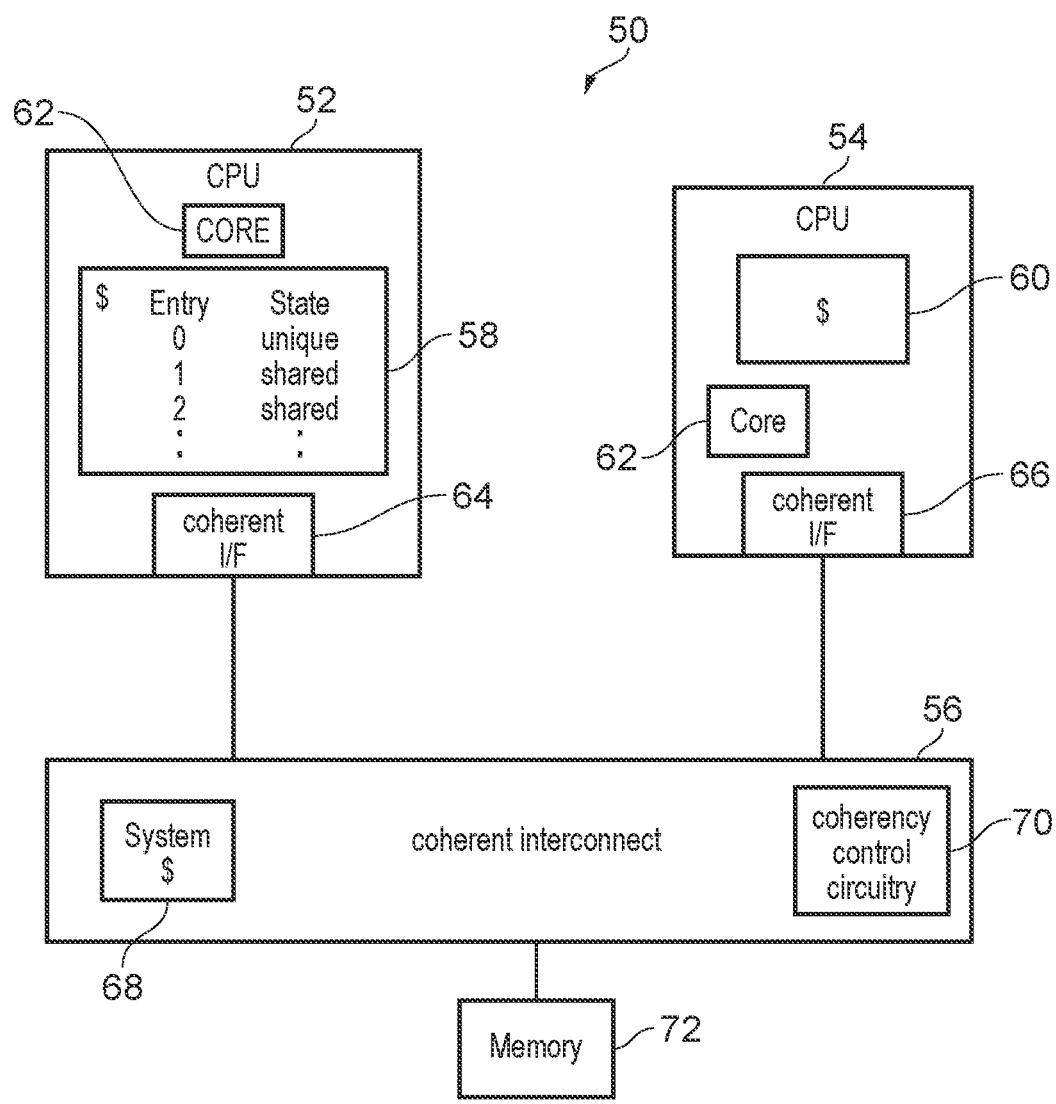
FIG. 6 illustrates an example data processing system in which the present technique may be performed.

FIG. 6 illustrates an example data processing system 50 in which the present technique may be performed, and illustrates an example where the attribute comprises a cache coherency attribute specifying a cache coherency state in which data corresponding to the prefetch target address is to be brought into a cache.

As shown, data processing system 50 includes requester devices 52 and 54 and a coherent interconnect 56 for managing cache coherency between the requester devices and other caches. The coherent interconnect 56 is responsible for maintaining a coherency between data cached in caches of the requester devices. The coherent interconnect 56 may support a coherency protocol which defines a set of cache coherency states, transaction types, and rules for processing each transaction type, to control access to shared memory 72 so that after one requester updates data for a given address, other requesters requesting the data for that address receive the latest value updated by the first requester and do not receive an old cached copy that is out of date after the update made by the first requester.

In this example the requester devices 52 and 54 include central processing units (CPU) 52 and 56 for performing general purpose processing. The CPUs 52 and 54 include caches 58 and 60, e.g. level 1 caches associated with particular cores 62 of the CPUs 52, 54. It will be appreciated that additional caches may be present, for example shared level 2 caches. Each of CPUs 52, 54 has a coherency interface 64, 66 for interacting with the coherent interconnect 56. For example, the coherency interface 64, 66 may be responsible for generating the required coherency protocol transactions in response to cache accesses from the relevant requester, and responding to snoop requests from the coherent interconnect 56 with appropriate responses and changes of coherency state. For example, when CPU 52 initiates a request to read or write data from a particular address in its cache 58, depending on the current coherency state this may trigger various requests to the interconnect which may send snoop requests to cache 60 in other requesters such as CPU 54 if necessary to query the coherency state of data at that requester's cache or trigger an invalidation of data from that requester's cache if necessary. It will be appreciated that this is just one example of some requester devices and other types of requesters could also be provided, such as graphical processing units, network interface controllers, display controllers for controlling display of data on a screen, or a DMA (direct memory access) controller for controlling transfer of data between memory and a peripheral device for example. Examples of coherency protocols which could be used are the AMBAR 4 ACE and AMBA® 5 CHI coherency protocols provided by Arm® Ltd of Cambridge, UK, but it will be appreciated that the techniques discussed herein could also be applied to other coherency protocols.

A system cache 68 is coupled to the coherent interconnect 56 but not assigned to a particular requester device. The system cache 30 may, for example, be provided to speed up access to data by uncached requesters (not shown), allowing faster access than if all reads and writes from the uncached requester have to be served by main memory 72. The coherent interconnect 56 may also be coupled to other types of devices (not shown), such as a cryptographic unit for providing cryptographic support to operations performed on the requester devices.

As shown in FIG. 6, the coherent interconnect 56 may include coherency control circuitry 70 for tracking which data addresses are cached at certain requester devices 52, 54. The coherency control circuitry 70 can be used to reduce snoop traffic by allowing the coherent interconnect 56 to determine when data is not cached at a particular requester. The coherency control circuitry 70 is not essential, and in some embodiments may provide an interconnect 56 which does not attempt to track the data cached at each requester. In this case, when one requester 55, 54 issues a read or write transaction to data which could be shared with other requesters, the coherent interconnect 56 may trigger snoop transactions to be issued to each other requester which could have a cached copy of the data from the same address, and manage changes in coherency state at those other requesters and/or responses to the requesting requester with more up to date versions of the data as necessary. Snoop filters may in some examples be used to at least partially track which CPU's private caches hold data for a given address so that some snoop traffic can be eliminated if it is known a given CPU does not hold the data for the given address.

As described herein, an example cache coherency state is a unique cache coherency state. In the unique cache coherency state, processing circuitry associated with the cache is allowed to write to a cache entry comprising the data corresponding to the prefetch target address without first issuing a request to check whether the data corresponding to the prefetch target address is held in a cache associated with other processing circuitry. A further example cache coherency state is a shared cache coherency state, in which processing circuitry associated with the cache is not allowed to write to a cache entry comprising the data corresponding to the prefetch target address without first issuing a request to check whether the data corresponding to the prefetch target address is held in a cache associated with other processing circuitry.

Cache 58 of CPU 58 may therefore track a coherency state of cache entries in the cache 58 to inform how processing circuitry associated with the cache 58 is allowed to write to the cache entries, i.e. whether a request must be issued before writing to a cache entry to check whether the data corresponding to the address is held in a cache associated with other processing circuitry. Hence, as shown in FIG. 6, cache 58 includes a number of cache entries each associated with a cache coherency state of a shared cache coherency state or a unique cache coherency state.

Memory access requests that are memory store requests (also known as write requests) are associated with the unique cache coherency state. Memory access requests that are memory load requests (also known as read requests) are associated with the shared cache coherency state. However, the prefetcher when prefetching data from a given address may not know whether any subsequent demand access to the prefetched address is likely to be a load or a store.

With reference to FIGS. 1 and 2, a stream of memory access requests input to prefetcher 40 may comprises a mixture of memory store requests and memory load requests, with each of these memory access requests requiring either a unique cache coherency state or a shared cache coherency state. However, the offset in time between the requests used as input to the prefetcher to trigger a given prefetch request and the subsequent demand access which will actually use the prefetched data means that it cannot be assumed that the prefetch request should simply use the same attribute as the input request that triggered that prefetch request.

Thus, in this example, the given attribute specifies the unique cache coherency state. Accordingly, the prefetch request attribute prediction circuitry 44 is configured to track the relative frequency of memory store requests present in the stream of memory access requests using the frequency tracking indicator, e.g. by using a counter incremented when a memory store request is determined and decremented when a memory load request is identified. If the counter then satisfies a predetermined threshold, the attribute value specified in the prefetch request is a value that indicates a unique cache coherency state.

As a result, an increased granularity of the prediction technique for whether the attribute specified in the prefetch request should indicate a unique or shared cache coherency state can be achieved. Hence, when the memory access performed on demand to an address previously prefetched by a prefetch request does not require a unique cache coherency state (for example because it is a memory load request), the prefetch is more likely to be have requested the prefetched data in the shared cache coherency state, avoiding the performance cost incurred at another CPU 54 which may otherwise unnecessarily invalidate its cached copy (harming its own performance if that data is needed again by CPU 54) if the prefetch at the CPU 52 causes the data to unnecessarily be requested in the unique coherency state.

Similar improvements will now be discussed with reference to the example arrangements of FIGS. 7 to 9.

Figure 7:
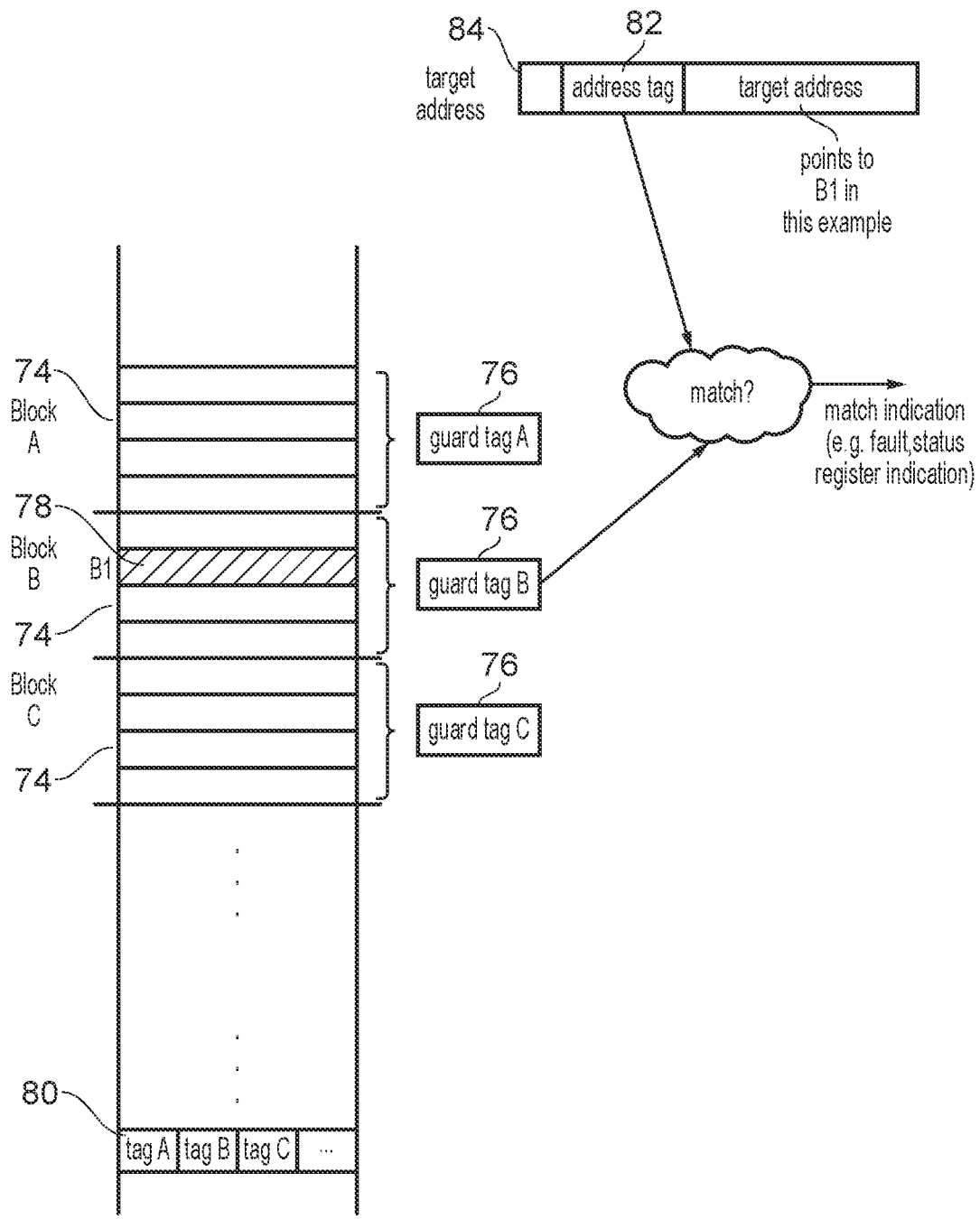
FIG. 7 illustrates a concept of tag-guarded memory accesses which may be used with the present technique.

FIG. 7 illustrates a concept of tag-guarded memory accesses (also known as memory tagging, such as the Memory Tagging Extension provided by Arm® Ltd of Cambridge, UK) which may be used with the present technique. In this example, the attribute comprises a tag checking attribute specifying whether a tag check would be required for the prefetch target address associated with the prefetch request, the tag check comprising comparing an address tag associated with the prefetch target address with a guard tag stored in a memory system in association with a block of one or more memory locations comprising an addressed location identified by a target physical address corresponding to the prefetch target address.

As shown in FIG. 7, the physical address space used to refer to memory locations within the memory system may be logically partitioned into a number of blocks 74 each comprising a certain number of addressable locations. For conciseness, in the example of FIG. 7, each block 74 comprises four memory locations, but other block sizes could be used as well. Each block 74 is associated with a corresponding guard tag 76. The guard tags associated with a certain number of blocks 74 can be gathered together and stored either within a different architecturally accessible memory location 78 within the physical address space, or within additional storage locations provided in main memory which are not architecturally accessible (not mapped to the same physical address space). The use of separate non-architecturally accessible storage may in some cases be preferred to avoid using up space in the data caches for caching guard tag values, which could impact on the performance of the regular code and could make coherency management more complex. An additional tag cache could be provided in the micro architecture for caching tag values from the non-architecturally accessible storage, for faster access than if the tags had to be accessed from main memory. The particular mapping of which tag storage locations 80 correspond to each block 74 may be controlled by the load/store unit and could be hardwired or could be programmable. In general, it is a choice for the particular micro architectural implementation exactly how the guard tags 76 are associated with the corresponding blocks 74 of the physical address space.

Hence, when a tag-guarded memory access is required, an address tag 82 is compared against the guard tag 76 which is associated with the block of memory locations 74 which includes the addressed location 78. For example, in FIG. 7 the target physical address 84 points to a certain location B1 in memory, marked 78 in the address space of FIG. 7. Therefore the guard tag B which is associated with the block of locations B including location B1 is compared against the address tag 82 associated with the target physical address 84.

Hence, when a memory access is performed, tag checking circuitry may compare the address tag 82 and the guard tag 76 associated with a block 74 including the addressed location 78 identified based on the target physical address 84, and determine whether they match. The tag checking circuitry generates a match indication indicating whether the address tag 82 and the guard tag 76 matched. For example, this match indication could be a fault signal which is generated if there is a mismatch between the address tag 82 and the guard tag 76, or an indication placed in a status register indicating whether there was a match, or an entry added to an error report to indicate the address for which the error was detected and/or the instruction address of the instruction which triggered the error.

With reference to FIGS. 1 and 2, a stream of memory access requests input to prefetcher 40 may comprise a mixture of memory requests having a tag checking attribute specifying that a tag check would be required for the prefetch target address associated with the prefetch request and memory access requests having a tag checking attribute specifying that a tag check would not be required for the prefetch target address associated with the prefetch request, or an absence of a tag checking attribute.

Thus, in this example, the given attribute value is a value that specifies that the tag check would be required for the prefetch target address. Accordingly, the prefetch request attribute prediction circuitry 44 is configured to track the relative frequency of memory access requests present in the stream of memory access requests that have attributes specifying that a tag check is required for the target address, e.g. by using a counter incremented when a memory access request has an attribute specifying that a tag check is required for the target address and decremented when a memory access request does not have an attribute specifying this or has an attribute that specifies that a tag check is not required.

As a result, an increased granularity of the prediction technique for whether the attribute specified in the prefetch request should indicate that a tag check is required can be achieved. Hence, when a subsequent demand access request that does not require a tag check is performed for the prefetched data, the subsequent demand access request is more likely to be performed without also loading a guard tag. Thus, processing associated with unnecessarily loading a guard tag for a memory access that does not require a tag check is avoided. Hence, computing time and resources are preserved and the efficiency of prefetching is increased.

Figure 8:
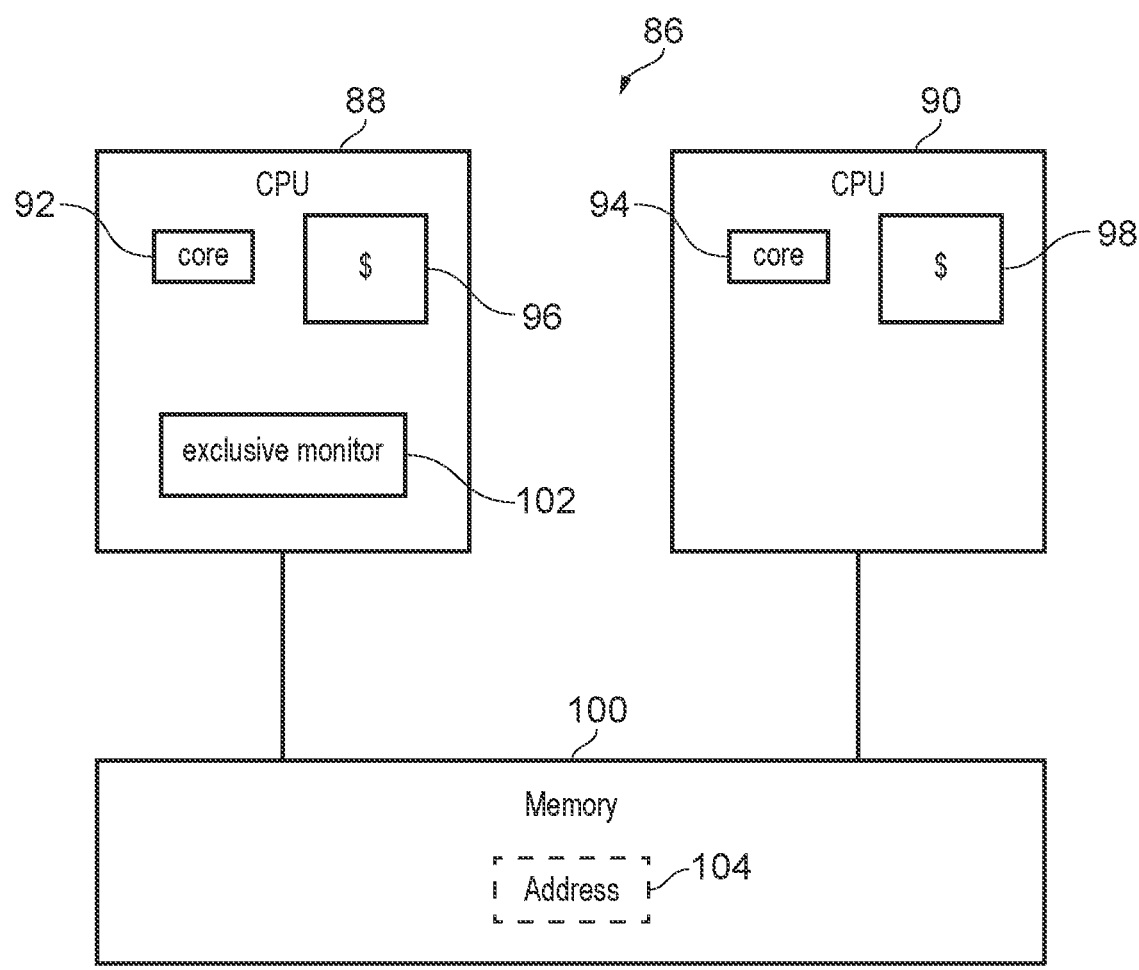
FIG. 8 illustrates an example data processing system in which the present technique may be performed.

FIG. 8 illustrates an example data processing system in which the present technique may be performed. In this example, the attribute comprises an exclusive access attribute indicating whether the memory access request is subject to an exclusive access condition, the exclusive access condition dependent on exclusive access monitoring for checking whether any other requester has accessed the corresponding memory location in a period during which a current requester holds exclusive access rights.

As shown in FIG. 8, data processing system 86 includes requester devices 88, 90, which are shown as CPUs in this example. CPUs 88, 90, each have cores 92, 94 and caches 96, 98, and have access to memory 100. It will be appreciated that a coherent interconnect may also be present which controls access to the memory 100 from the requesters devices 88, 90.

CPU 88 also includes an exclusive monitor 102 for tracking an exclusive access status associated with a particular address in memory, and for checking whether any other requester has accessed the particular address in memory associated with the exclusive access status in a period during which CPU 88 holds exclusive access rights. In this example, an exclusive access status setting instruction is executed that specifies address 104, and exclusive monitor 102 tracks that address 104 has an exclusive access status set. Exclusive monitor 102 then monitors or checks for events which could indicate a conflicting memory access to the tracked address (address 104) and if one is detected, the exclusive monitor 102 clears the exclusive access status associated with address 104. Certain instructions, such as memory store instructions flagged as requiring the exclusive access condition, may test whether the tracked address is still indicated as having exclusive access status and may control processing circuitry to perform operations conditional on whether that address remains indicated as having the exclusive status. If the exclusive access condition is not satisfied, these instructions may fail, incurring greater performance overhead in repeating the same operations later after retrying to gain exclusive access.

With reference to FIGS. 1 and 2, a stream of memory access requests input to prefetcher 40 may comprise a mixture of memory requests having an attribute that comprises an exclusive access attribute indicating that the memory access request is subject to an exclusive access condition and memory requests having an attribute that comprises an exclusive access attribute indicating that the memory access request is not subject to an exclusive access condition or an absence of an exclusive access attribute.

Thus, in this example, the given attribute value is the value that indicates that the memory access request is subject to the exclusive access condition. Accordingly, the prefetch request attribute prediction circuitry 44 is configured to track the relative frequency of memory access requests present in the stream of memory access requests that have attributes specifying that the memory access request is subject to the exclusive access condition, e.g. by using a counter incremented when a memory access request has an attribute specifying that the memory access is subject to the exclusive access condition and decremented when a memory access request does not have an attribute specifying this or has an attribute that specifies that the memory access is not subject to the exclusive access condition.

As a result, an increased granularity of the prediction technique for whether the attribute specified in the prefetch request should indicate that memory access is subject to the exclusive access condition can be achieved. Hence, when a later demand access request that uses the prefetched data is not subject to the exclusive access condition, the memory access is more likely to be performed without also imposing the exclusive access condition. Unnecessarily imposing an exclusive access condition may cause exclusive monitors of other cores to clear their exclusive access status, which harms performance at the other cores if their conditional operations (i.e. conditional on whether the relevant address remains indicated as having the exclusive status) fail when they should have passed. Thus, the associated detrimental effects to performance associated with unnecessarily imposing an exclusive access condition can be avoided. Hence, computing time and resources are preserved and the efficiency of prefetching is increased.

Figure 9:
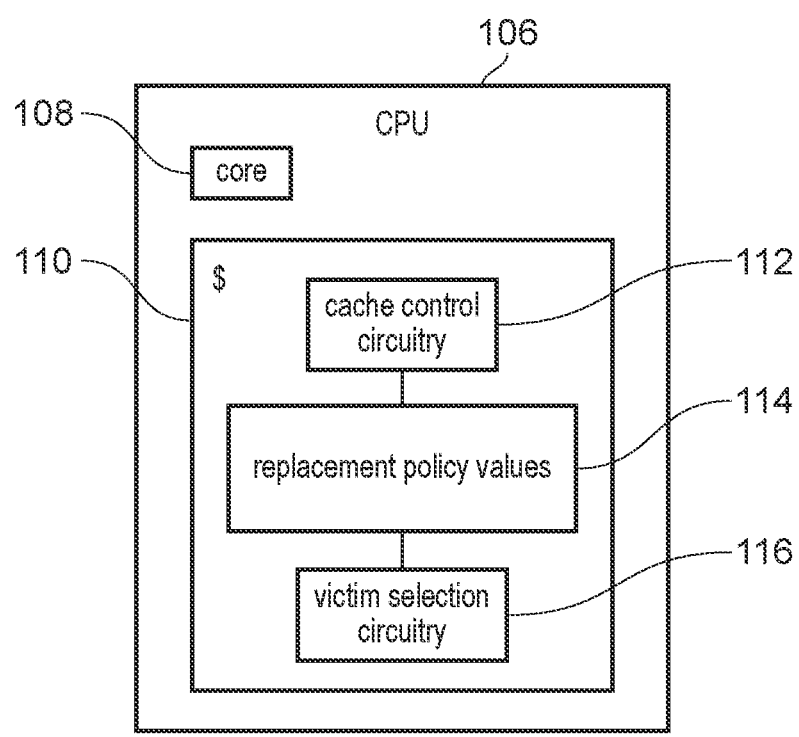
FIG. 9 illustrates example data processing apparatus in which the present technique may be performed.

FIG. 9 illustrates an example data processing apparatus in which the present technique may be performed. In this example, the attribute comprises a temporal access attribute indicating a likelihood of repeated future access to the prefetch target address within a forthcoming period.

FIG. 9 includes a CPU 106. CPU 106 includes a core 108, and a cache 110. Cache 110 has a finite storage capacity and thus when a further cache entry is to be stored within cache 110, it may be necessary to evict a cache entry which is already present in cache 110 to provide storage space for the further cache entry. In order to select which cache entry should be evicted from the cache, there are a variety of known cache replacement mechanism which utilize respective replacement or eviction policies. In this example, memory access requests are each associated with an attribute having a temporal access attribute that indicates a likelihood of repeated future access to the corresponding target address of the memory access request within a forthcoming time period. This temporal access attribute may be used by cache control circuitry 112 of the cache 110 to select, based on the temporal access attribute, an initial value for a cache replacement policy value 114 to be specified in a newly allocated cache entry for a target address specified in a prefetch request. Cache 110 also includes victim selection circuitry 116 to select a victim cache entry to be evicted from the cache dependent on the cache replacement policy value 114. By setting the initial value for the cache replacement policy value 114 to different values depending on the predicted time to a future access, this can improve cache allocation policies to increase average hit rates, e.g. by avoiding data for an address unlikely to be accessed for long remaining resident in the cache for longer than data for an address more likely to be accessed in future.

With reference to FIGS. 1 and 2, a stream of memory access requests input to prefetcher 40 may comprise a mixture of memory requests having temporal access attributes indicating a likelihood of repeated future access to the corresponding target address within a forthcoming period. For example, the stream of memory access requests may comprise a mixture of temporal load/store requests and non-temporal load/store requests. Non-temporal load/store requests may indicate that the likelihood of reuse of the corresponding data in a forthcoming period is low compared to a temporal load/store request.

Thus, in this example, the given attribute value is a value that indicates a smallest likelihood of repeated future access to the prefetch target address within the forthcoming period. In some examples, the memory access requests requiring the given attribute value are non-temporal load/store requests. Accordingly, the prefetch request attribute prediction circuitry 44 is configured to track the relative frequency of memory access requests present in the stream of memory access requests that have attributes indicating a smallest likelihood of repeated future access to the prefetch target address within the forthcoming period, e.g. by using a counter incremented when a memory access request has an attribute indicating a smallest likelihood of repeated future access to the prefetch target address within the forthcoming period and decremented when a memory access request does not indicate this. For example, the counter may be incremented when it is determined that a non-temporal load/store request is present in the stream and decremented when it is determined that a temporal load/store request is present in the stream.

As a result, an increased granularity of the prediction technique for whether the attribute specified in the prefetch request should indicate a smallest likelihood of repeated future access to the prefetch target address within the forthcoming period can be achieved. Hence, when the data corresponding to the prefetch target address is brought into a cache, it may be specified with the appropriate temporal access attribute and thus cache replacement policy value. As a result, because the cache entry is stored with a cache replacement policy value corresponding to a temporal access attribute that indicates that the likelihood that there will be repeated future access to the prefetch target address is low (for example because it is associated with a non-temporal load/store request), the data stored in the cache entry may be preferentially evicted from the cache. This causes other cache entries which have a greater chance of being accessed in the forthcoming period from being evicted unnecessarily, thus reducing the likelihood that these other cache entries need to be loaded again into the cache, which would incur additional processing and reduce cache and prefetching performance.

It will be appreciated that memory access requests may be associated an attributes which comprise one or more of the attributes discussed herein and this is not particularly limited. For example, memory access requests may be associated with an attribute which controls how the memory system should process the memory access request, and this may include one or more of the coherency attribute, tag checking attribute, exclusive access attribute, and temporal access attribute described herein.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 10:
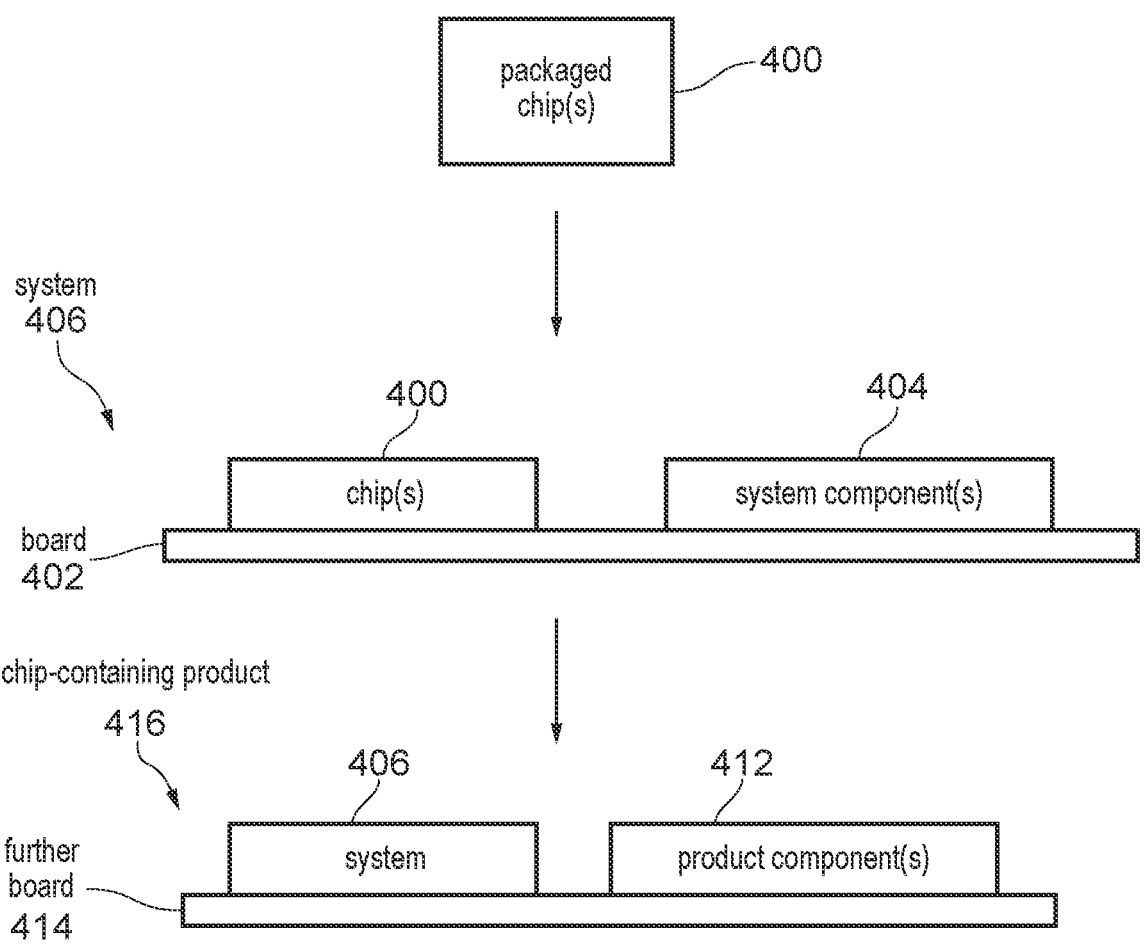
FIG. 10 illustrates a system and a chip-containing product.

As shown in FIG. 10, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus comprising:
   prefetch control circuitry to control issuing of a prefetch request to prefetch data from a memory system, the prefetch request specifying a prefetch target address and an attribute; and
   prefetch request attribute prediction circuitry to predict an attribute value to be specified for the attribute in the prefetch request, based on a relative frequency of memory access requests in a stream of memory access requests requiring a given attribute value for the attribute.
2. The apparatus of clause 1, in which the prefetch request attribute prediction circuitry is configured to track the relative frequency of memory access requests in the stream requiring the given attribute value using a frequency tracking indicator having more than two tracking states.
3. The apparatus of clause 1 or clause 2, in which the prefetch request attribute prediction circuitry is configured to maintain multiple frequency tracking indicators for tracking the relative frequency of memory access requests requiring the given attribute value for multiple streams of memory access requests.
4. The apparatus of any preceding clause, in which, to predict the attribute value, the prefetch request attribute prediction circuitry is configured to compare a frequency tracking indicator indicative of the relative frequency of memory access requests in the stream requiring the given attribute value to a predetermined threshold, and in response to determining that the frequency tracking indicator satisfies the predetermined threshold, predict the attribute value as the given attribute value.
5. The apparatus of any of clauses 2 to 4, in which the frequency tracking indicator comprises a counter and the prefetch request attribute prediction circuitry is configured to increment or decrement the counter by an increment value or decrement value based on whether a memory access request in the stream requires the given attribute value or another attribute value for the attribute.
6. The apparatus of clause 5, in which the increment value and the decrement value are the same.
7. The apparatus of clause 5, in which the increment value and the decrement value are different.
8. The apparatus of any of clauses 5 to 7, in which at least one of the increment value and decrement value is variable based on a configuration input.
9. The apparatus of any of clauses 5 to 8, in which the prefetch request attribute prediction circuitry is configured to modify the value of the counter when the value of the counter reaches a predetermined value or a predetermined prefetcher training period has elapsed.
10. The apparatus of any preceding clause, in which the attribute comprises an attribute which controls how the memory system should process the prefetch request to prefetch data from the prefetch target address.
11. The apparatus of any preceding clause, in which the attribute comprises a cache coherency attribute specifying a cache coherency state in which data corresponding to the prefetch target address is to be brought into a cache.
12. The apparatus of clause 11, in which the given attribute value specifies a unique cache coherency state representing that processing circuitry associated with the cache is allowed to write to a cache entry comprising the data corresponding to the prefetch target address without first issuing a request to check whether the data corresponding to the prefetch target address is held in a cache associated with other processing circuitry.
13. The apparatus of clauses 11 or 12, in which the memory access requests requiring the given attribute value are memory store requests.

14. The apparatus of any of clauses 1 to 13, in which the attribute comprises a tag checking attribute specifying whether a tag check would be required for the prefetch target address associated with the prefetch request, the tag check comprising comparing an address tag associated with the prefetch target address with a guard tag stored in a memory system in association with a block of one or more memory locations comprising an addressed location identified by a target physical address corresponding to the prefetch target address.

15. The apparatus of clause 14, in which the given attribute value is a value that specifies that the tag check would be required for the prefetch target address.

16. The apparatus of any of clauses 1 to 15, in which the attribute comprises an exclusive access attribute indicating whether the memory access request is subject to an exclusive access condition, the exclusive access condition dependent on exclusive access monitoring for checking whether any other requester has accessed the corresponding memory location in a period during which a current requester holds exclusive access rights.

17. The apparatus of clause 16, in which the given attribute value is the value that indicates that the memory access request is subject to the exclusive access condition.

18. The apparatus of any of clauses 1 to 17, in which the attribute comprises a temporal access attribute indicating a likelihood of repeated future access to the prefetch target address within a forthcoming period.

19. The apparatus of clause 18, in which the given attribute value is a value that indicates a smallest likelihood of repeated future access to the prefetch target address within the forthcoming period.

20. The apparatus of any clauses 18 or 19, comprising:
cache control circuitry to select, based on the temporal access attribute, an initial value for a cache replacement policy value to be specified in a newly allocated cache entry for the prefetch target address; and
victim selection circuitry to select a victim cache entry to be evicted from the cache dependent on the cache replacement policy value.

21. The apparatus of any preceding clause, in which the prefetch control circuitry is configured to send the issued prefetch request to further prefetch control circuitry to cause the further prefetch control circuitry to use the prefetch request as a training input for training the further prefetch control circuitry.

22. The apparatus of any preceding clause, in which the prefetch control circuitry is configured to control issuing of prefetch requests based on stride prefetching, best-offset prefetching or indirect prefetching.

23. A system comprising:
the apparatus of any preceding claim, implemented in at least one packaged chip;
at least one system component; and
a board,
wherein the at least one packaged chip and the at least one system component are assembled on the board.

24. A chip-containing product comprising the system of clause 23 assembled on a further board with at least one other product component.

25. A non-transitory computer-readable medium to store computer-readable code for fabrication of an apparatus comprising:
prefetch control circuitry to control issuing of a prefetch request to prefetch data from a memory system, the prefetch request specifying a prefetch target address and an attribute; and
prefetch request attribute prediction circuitry to predict an attribute value to be specified for the attribute in the prefetch request, based on a relative frequency of memory access requests in a stream of memory access requests requiring a given attribute value for the attribute.

26. A method comprising:
controlling, by prefetch control circuitry, issuing of a prefetch request to prefetch data from a memory system, the prefetch request specifying a prefetch target address and an attribute; and
predicting, by prefetch request attribute prediction circuitry, an attribute value to be specified for the attribute in the prefetch request, based on a relative frequency of memory access requests in a stream of memory access requests requiring a given attribute value for the attribute.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
prefetch control circuitry configured to control issuing of a prefetch request to prefetch data from a memory system, the prefetch request specifying a prefetch target address and an attribute; and
prefetch request attribute prediction circuitry configured to predict an attribute value to be specified for the attribute in the prefetch request, based on a relative frequency of memory access requests in a stream of memory access requests requiring a given attribute value for the attribute.

2. The apparatus of claim 1, in which the prefetch request attribute prediction circuitry is configured to track the relative frequency of memory access requests in the stream requiring the given attribute value using a frequency tracking indicator having more than two tracking states.

3. The apparatus of claim 2, in which the frequency tracking indicator comprises a counter and the prefetch request attribute prediction circuitry is configured to increment or decrement the counter by an increment value or decrement value based on whether a memory access request in the stream requires the given attribute value or another attribute value for the attribute.

4. The apparatus of any of claim 3, in which at least one of the increment value and decrement value is variable based on a configuration input.

5. The apparatus of claim 1, in which, to predict the attribute value, the prefetch request attribute prediction circuitry is configured to compare a frequency tracking indicator indicative of the relative frequency of memory access requests in the stream requiring the given attribute value to a predetermined threshold, and in response to determining that the frequency tracking indicator satisfies the predetermined threshold, predict the attribute value as the given attribute value.

6. The apparatus of claim 1, in which the attribute comprises an attribute which controls how the memory system should process the prefetch request to prefetch data from the prefetch target address.

7. The apparatus of claim 1, in which the attribute comprises a cache coherency attribute specifying a cache coherency state in which data corresponding to the prefetch target address is to be brought into a cache.

8. The apparatus of claim 7, in which the given attribute value specifies a unique cache coherency state representing that processing circuitry associated with the cache is allowed to write to a cache entry comprising the data corresponding to the prefetch target address without first issuing a request to check whether the data corresponding to the prefetch target address is held in a cache associated with other processing circuitry.

9. The apparatus of claim 7, in which the memory access requests requiring the given attribute value are memory store requests.

10. The apparatus of claim 1, in which the attribute comprises a tag checking attribute specifying whether a tag check would be required for the prefetch target address associated with the prefetch request, the tag check comprising comparing an address tag associated with the prefetch target address with a guard tag stored in a memory system in association with a block of one or more memory locations comprising an addressed location identified by a target physical address corresponding to the prefetch target address.

11. The apparatus of claim 10, in which the given attribute value is a value that specifies that the tag check would be required for the prefetch target address.

12. The apparatus of claim 1, in which the attribute comprises an exclusive access attribute indicating whether the memory access request is subject to an exclusive access condition, the exclusive access condition dependent on exclusive access monitoring for checking whether any other requester has accessed the corresponding memory location in a period during which a current requester holds exclusive access rights.

13. The apparatus of claim 12, in which the given attribute value is the value that indicates that the memory access request is subject to the exclusive access condition.

14. The apparatus of claim 1, in which the attribute comprises a temporal access attribute indicating a likelihood of repeated future access to the prefetch target address within a forthcoming period.

15. The apparatus of claim 14, in which the given attribute value is a value that indicates a smallest likelihood of repeated future access to the prefetch target address within the forthcoming period.

16. The apparatus of claim 14, comprising:
cache control circuitry to select, based on the temporal access attribute, an initial value for a cache replacement policy value to be specified in a newly allocated cache entry for the prefetch target address; and
victim selection circuitry to select a victim cache entry to be evicted from the cache dependent on the cache replacement policy value.

17. A system comprising:
the apparatus of claim 1, implemented in at least one packaged chip;
at least one system component; and
a board,
wherein the at least one packaged chip and the at least one system component are assembled on the board.

18. A chip-containing product comprising the system of claim 17 assembled on a further board with at least one other product component.

19. A non-transitory computer-readable medium to store computer-readable code for fabrication of an apparatus comprising:
prefetch control circuitry to control issuing of a prefetch request to prefetch data from a memory system, the prefetch request specifying a prefetch target address and an attribute; and
prefetch request attribute prediction circuitry to predict an attribute value to be specified for the attribute in the prefetch request, based on a relative frequency of memory access requests in a stream of memory access requests requiring a given attribute value for the attribute.

20. A method comprising:
controlling, by prefetch control circuitry, issuing of a prefetch request to prefetch data from a memory system, the prefetch request specifying a prefetch target address and an attribute; and
predicting, by prefetch request attribute prediction circuitry, an attribute value to be specified for the attribute in the prefetch request, based on a relative frequency of memory access requests in a stream of memory access requests requiring a given attribute value for the attribute.

* * * * *